(12) United States Patent
Lo et al.

(10) Patent No.: US 6,425,071 B1
(45) Date of Patent: Jul. 23, 2002

(54) SUBSYSTEM BRIDGE OF AMBA'S ASB BUS TO PERIPHERAL COMPONENT INTERCONNECT (PCI) BUS

(75) Inventors: Burton B. Lo, San Francisco; Anthony L. Pan, Fremont, both of CA (US)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/303,890

(22) Filed: May 3, 1999

(51) Int. Cl.[7] .............................................. G06F 13/00
(52) U.S. Cl. ......................................... 712/41; 712/38
(58) Field of Search ............................. 712/41, 29, 38; 710/105

(56) References Cited

U.S. PATENT DOCUMENTS

| | | | | |
|---|---|---|---|---|
| 5,636,370 A | * | 6/1997 | Sicsic | 703/24 |
| 5,768,537 A | * | 6/1998 | Butter | 709/247 |
| 5,898,688 A | * | 4/1999 | Norton | 370/362 |
| 6,064,626 A | * | 5/2000 | Stevens | 365/233 |
| 6,157,955 A | * | 12/2000 | Narad | 709/228 |

\* cited by examiner

Primary Examiner—Eric Coleman
(74) Attorney, Agent, or Firm—Wagner, Murabito & Hao LLP (57) ABSTRACT

A method and apparatus to bridge between the PCI bus and a RISC processor interface bus. In one embodiment, the present invention is a single-ASIC implementation rather than a design using multiple discrete circuit components. The invention incorporates a method and apparatus that will minimize subsystem latencies and inefficiencies in order to maximize data throughput and system performance. In yet another embodiment, the RISC processor interface bus is the AMBA ASB bus. The invention further provides an Advanced RISC Machine interface bus unit which uses an improved clock crossing handshake mechanism that can support a range of clock frequencies on the AMBA ASB bus.

21 Claims, 10 Drawing Sheets

FIGURE 3A
AMBA ASD SIGNALS DURING ASB WRITE TO SRAM

FIGURE 3B

SRAM SIGNALS DURING ASB WRITE TO SRAM

FIGURE 4A
AMBA ASB SIGNALS DURING ASB READ FROM SRAM

FIGURE 4B
SRAM SIGNALS DURING ASB READ FROM SRAM

FIGURE 5A
AMBA ASB SIGNALS DURING ASB WRITE TO PCI

FIGURE 5B
PCI SIGNALS DURING ASB WRITE TO PCI

FIGURE 6A
AMBA ASB SIGNALS DURING ASB READ FROM PCI

FIGURE 6B
PCI SIGNALS DURING ASB READ FROM PCI

SUBSYSTEM BRIDGE OF AMBA'S ASB BUS TO PERIPHERAL COMPONENT INTERCONNECT (PCI) BUS

BACKGROUND OF THE INVENTION

1. Field of the Invention

The present invention relates to the field of interface bridges between bus domains. Specifically, the present invention relates to bridging a processor bus domain to a second bus domain.

2. Related Art

Figure 1:
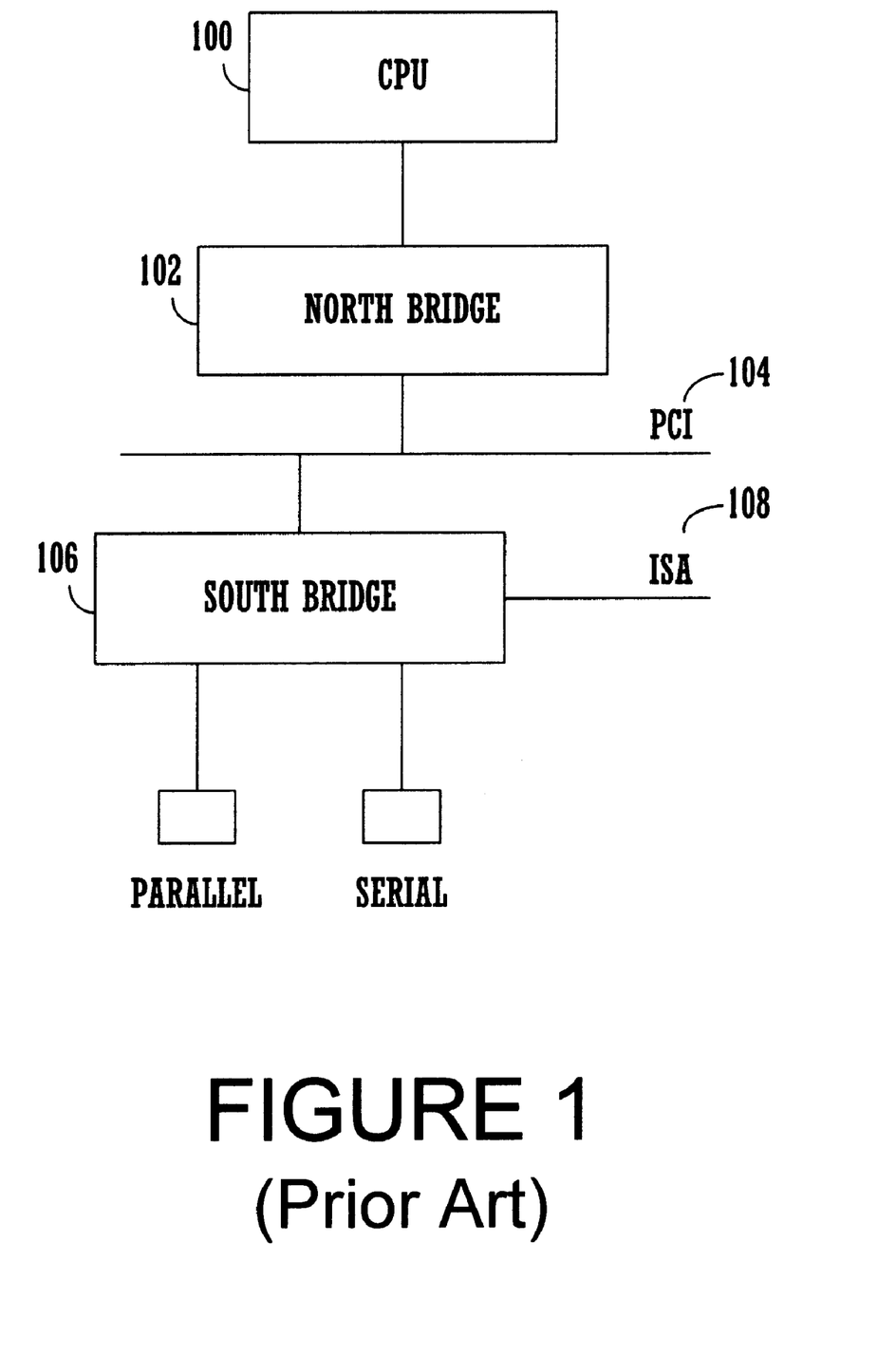
FIG. 1 depicts the prior art configuration of a host computer having a general purpose Central Processing Unit (CPU) interfaced to a Peripheral Component Interconnect (PCI) device via a Northbridge integrated circuit device.

The prior art configuration of FIG. 1 shows a host computer's general Central Processing Unit (CPU) 100 interfaced to a Peripheral Component Interconnect (PCI) device 104 via a Northbridge integrated circuit device 102. The Northbridge device is commercially available for that use. Similarly, the Southbridge device 106 is also readily available for purposes of interfacing a general purpose CPU 100 to an ISA device 108.

Unlike commercially available CPUs, the Advanced RISC Machine (ARM) processor is a special purpose, user-customizable RISC processor which is very well suited to processor-intensive functions, such as handwriting recognition and other real-time digital signal processing applications for data and voice communications. With ARM's small 32 bit RISC CPUs, integrated, high performance designs can be custom-developed for relatively very fast time-to-market and low product development costs.

PCI-based computer peripheral devices are used extensively in host computer systems and are readily available commercially. One reason why the ARM processor has not been combined with a PCI device is due to the fact that host computers use general purpose CPUs, which can be interfaced to PCI devices using the Northbridge solution.

Embedding an ARM processor for a specialized subsystem function, such as within a network adapter interface card, can significantly improve the overall host system performance since it lessens the need to use the host CPU for the subsystem networking functions. So to the extent that an embedded processor can perform the network subsystem processor functions, it frees up the host CPU for other higher priority processing tasks. However, use of an ARM processor embedded within the network adapter subsystem can only be advantageous if the ARM processor can be interfaced to communicate with a PCI-based host CPU and other PCI peripheral devices through the PCI bus.

One interface bus developed for the ARM processor is the Advanced Microcontroller Bus Architecture (AMBA) which defines the Advanced System Bus (ASB). However, the AMBA ASB bus and the PCI bus operate at different clock frequencies and have different signaling schemes for data communication. Unlike the Northbridge device which exists to interface between general purpose CPUs and the PCI bus, there are no known devices for bridging between the ARM processor and a PCI interface bus.

SUMMARY OF THE INVENTION

The present invention provides a method and apparatus to bridge between the PCI bus and a RISC processor interface bus. In one embodiment, the present invention is a single-ASIC implementation rather than a design using multiple discrete circuit components. The invention incorporates a method and apparatus that will minimize subsystem latencies and inefficiencies in order to maximize data throughput and system performance. In yet another embodiment, the RISC processor interface bus is the AMBA ASB bus. The invention further provides an Advanced RISC Machine interface bus unit which uses an improved clock crossing handshake mechanism that can support a range of clock frequencies on the AMBA ASB bus.

The invention comprises a RISC processor bus coupled to a RISC processor interface unit for generating memory access requests and for generating requests over a Peripheral Component Interconnect bus. A memory interface unit is coupled to a memory unit and is for responding to memory access requests from a Peripheral Component Interconnect interface unit which is coupled to a Peripheral Component Interconnect bus. The Peripheral Component Interconnect interface unit is for communicating with a PCI device. An internal bus is coupled to the RISC processor interface unit, the memory interface unit and said Peripheral Component Interconnect interface unit. A RISC processor is coupled to the RISC processor bus, the RISC processor for communicating with the memory unit and with the Peripheral Component Interconnect device. The RISC processor interface unit operates at a first clock frequency, and the Peripheral Component Interconnect interface unit operates at a second clock frequency.

Specifically, an embodiment of the present invention includes an interface circuit comprising: a RISC processor bus; a RISC processor interface unit coupled to the RISC processor bus for generating memory access requests and for generating requests over a Peripheral Component Interconnect bus; a memory unit; a memory interface unit coupled to the memory unit and for responding to memory access requests to the memory unit; a Peripheral Component Interconnect interface unit coupled to a Peripheral Component Interconnect bus, the Peripheral Component Interconnect interface unit for communicating with a Peripheral Component Interconnect device; an internal bus coupled to the RISC processor interface unit, the memory interface unit and the Peripheral Component Interconnect interface unit; and a RISC processor coupled to the RISC processor bus, the RISC processor for communicating with the memory unit and with the Peripheral Component Interconnect device, wherein the RISC processor interface unit operates at a first clock frequency and wherein the Peripheral Component Interconnect interface unit operates at a second clock frequency.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the invention, a bridge between the PCI bus and a RISC processor interface bus, numerous specific details are set forth in order to provide a thorough understanding of the present invention. However, it will be obvious to one skilled in the art that the present invention may be practiced without these specific details. In other instances well known methods, procedures, components and circuits have not been described in detail as not to unnecessarily obscure aspects of the present invention.

Figure 2:
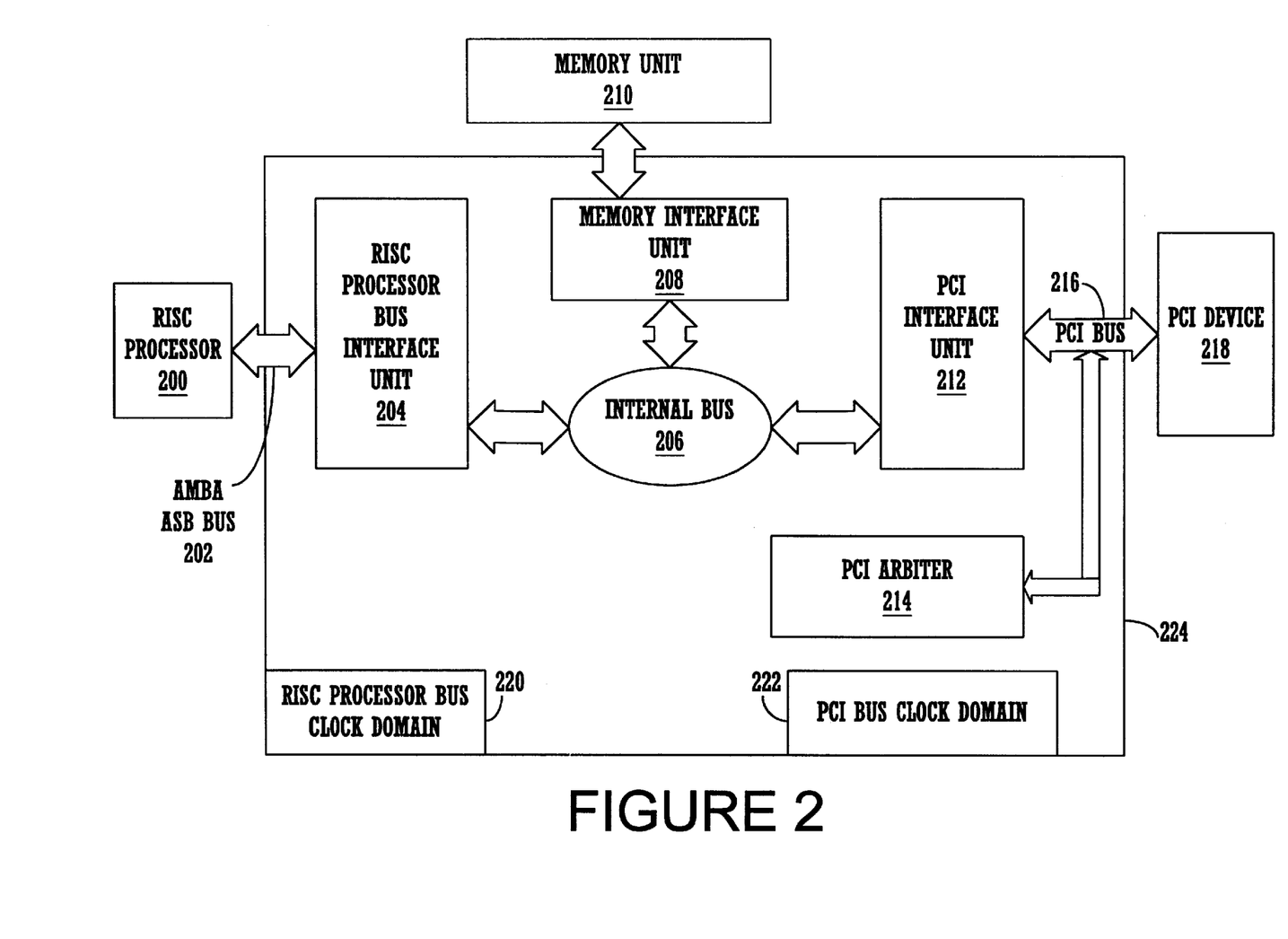
FIG. 2 is a block diagram of the invention, showing the arrangement of the apparatus for bridging from the RISC processor bus to the PCI bus.

With reference to FIG. 2, a RISC processor 200 communicates with a RISC processor bus interface unit 204 via the AMBA ASB bus 202. The RISC processor bus interface unit 204 contains an ASB slave interface which is described in co-pending U.S. patent application Ser. No. 09/304,034, filed concurrently with the present invention, entitled "Slave Interface Circuit for Providing Communication Between a Peripheral Component Interconnect (PCI) Domain and an ASB Domain," by B. Lo and A. Pan, assigned to the assignee of the present invention, and which is hereby incorporated by reference. The RISC processor bus interface unit 204 also may include a clock domain handshake circuit which is described in co-pending U.S. patent application Ser. No. 09/186,209, filed Nov. 3, 1998, entitled "Method and Circuit for Providing Handshaking to Transact Information Across Multiple Clock Domains," by B. Lo and A. Pan, assigned to the assignee of the present invention, which is hereby incorporated herein by reference.

The RISC processor bus interface unit 204 is coupled to a memory interface unit 208 via an internal bus 206. The memory interface unit 208 accesses a memory unit 210. A PCI interface unit 212 is coupled to a PCI device 218 via a PCI bus 216. The PCI interface unit 212 contains a FIFO circuit as described in U.S. patent application Ser. No. 09/138,943, now U.S. Pat. No. 6,115,760 filed Aug. 24, 1998, entitled "Intelligent Scaleable FIFO Buffer Circuit for Interfacing Between Digital Domains," by B. Lo and A. Pan, assigned to the assignee of the present invention, which is hereby incorporated herein by reference. The PCI interface unit 212 is also directly coupled to the memory interface unit 208. Memory interface unit 208 contains a byte accessible memory interface as described in U.S. patent application Ser. No. 09/139,148, now U.S. Pat. No. 6,055,594 filed on Aug. 24, 1998, entitled "Byte Accessible Memory Interface Using Reduced Memory Control Pin Count," by B. Lo and A. Pan, assigned to the assignee of the present invention, which is hereby incorporated herein by reference.

A PCI arbiter 214, which may be any commercially available implementation of a PCI arbiter, is coupled to the PCI bus 216, and arbitrates memory access to the latter. The PCI interface unit 212 also communicates directly with the internal bus 206. The RISC processor bus clock 220 operates at a frequency ranging from 4 to 20 MHz, while the PCI bus clock 222 operates at a frequency of 33 MHz.

In one embodiment, the RISC processor bus interface unit 204, the memory interface unit 208, the internal bus 206, the PCI interface unit 212, and the PCI arbiter 214 are implemented in a single-chip integrated ASIC 224.

Figure 3A:
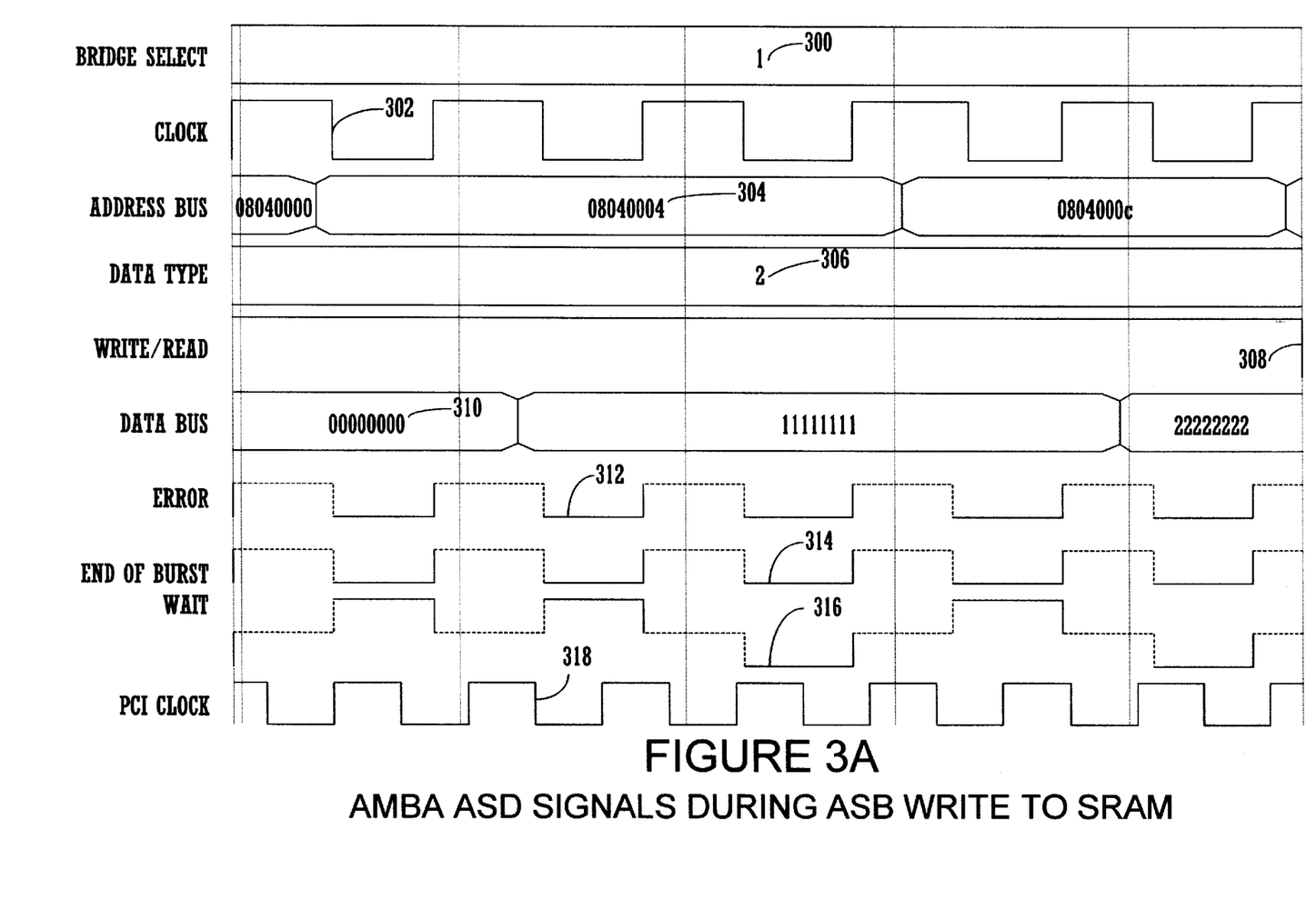
FIG. 3A shows the AMBA ASB signals during an ASB Write cycle to the SRAM.

With reference now to FIG. 3A, the AMBA ASB signals during an ASB Write to SRAM cycle is shown. Bridge Select signal 300 indicates ASB data transfer (Write or Read) to SRAM in the "1" condition, and would indicate that the bridge system is inactive in the "0" condition. The AMBA ASB domain Clock 302 operates at a frequency that is in the range of 4 MHz to 20 MHz. Address Bus 304 indicates a memory address for data transfer. Data Type 306 indicates the data type being transmitted, "0" for a single byte, "1" for 2 bytes (or a half-word) and "2" for 4 bytes (or a full word). Write/Read signal 308 indicates that the ASB Write is selected in the High condition, whereas the ASB Read would be selected in the Low condition. Data Bus signal 310 contains the data being transmitted from the ASB to the SRAM. Error signal 312 indicates whether there has been an error during the ASB Write cycle. End of Burst signal 314 indicates the end of a burst transmission from the ASB to another device in the High condition. Wait signal 316 is in the High condition to insert wait cycles, or goes Low to indicate that it is ready to handle data transfer. PCI clock 318 operates at the standard PCI clock frequency of 33 MHz, and is shown for reference purposes during ASB to SRAM Write.

Figure 3B:
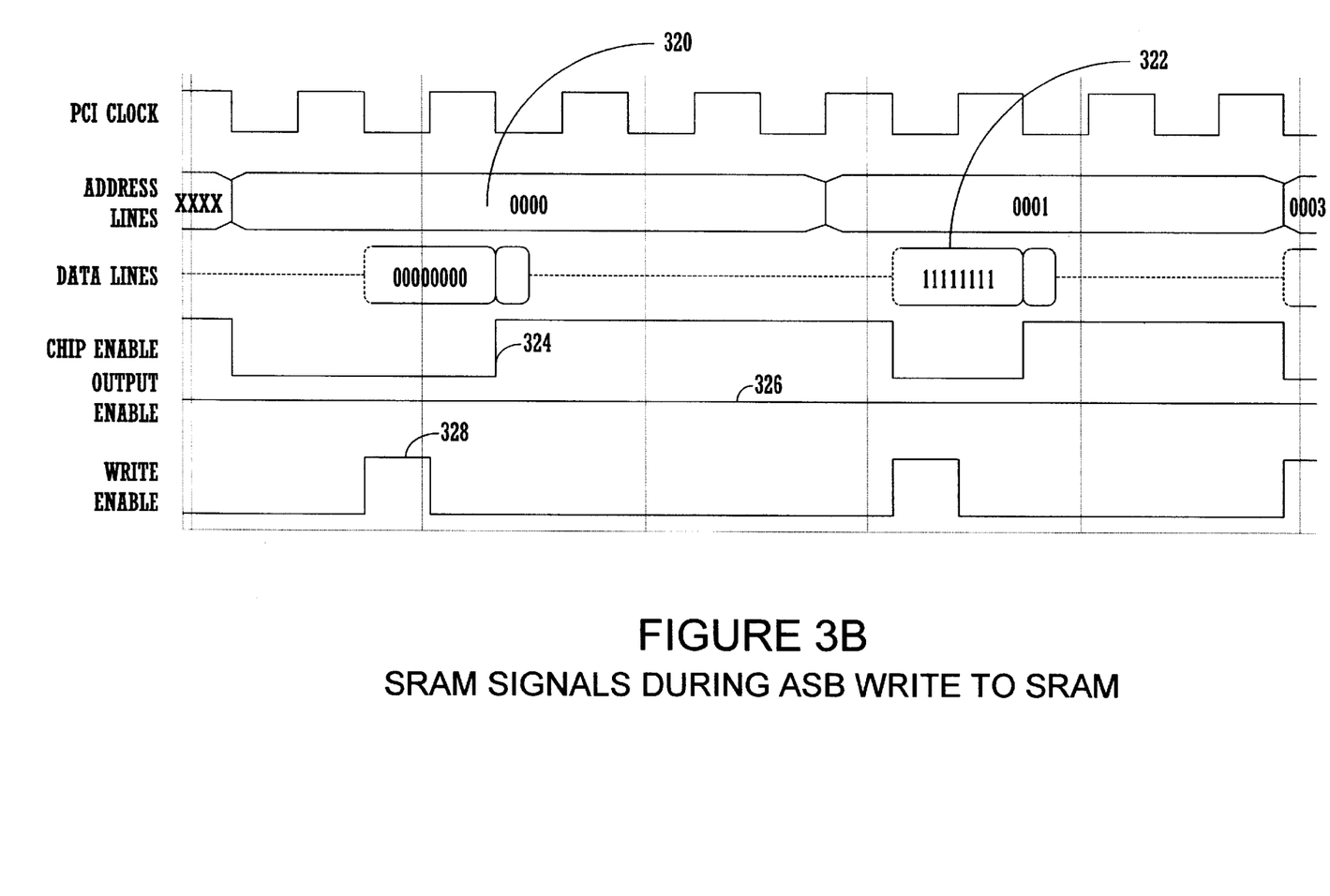
FIG. 3B shows the corresponding SRAM signals during the ASB Write cycle to SRAM.

Referring now to FIG. 3B, the corresponding SRAM signals during ASB Write to SRAM is shown. Address Lines signal 320 is for the SRAM address lines. Data Line signal 322 contains the data being written to the SRAM. Chip Enable signal 324 is active in the Low condition. Output Enable signal 326 is active in the Low condition. Write Enable signal 328 is active in the High condition, indicating a data write to the SRAM.

Figure 4A:
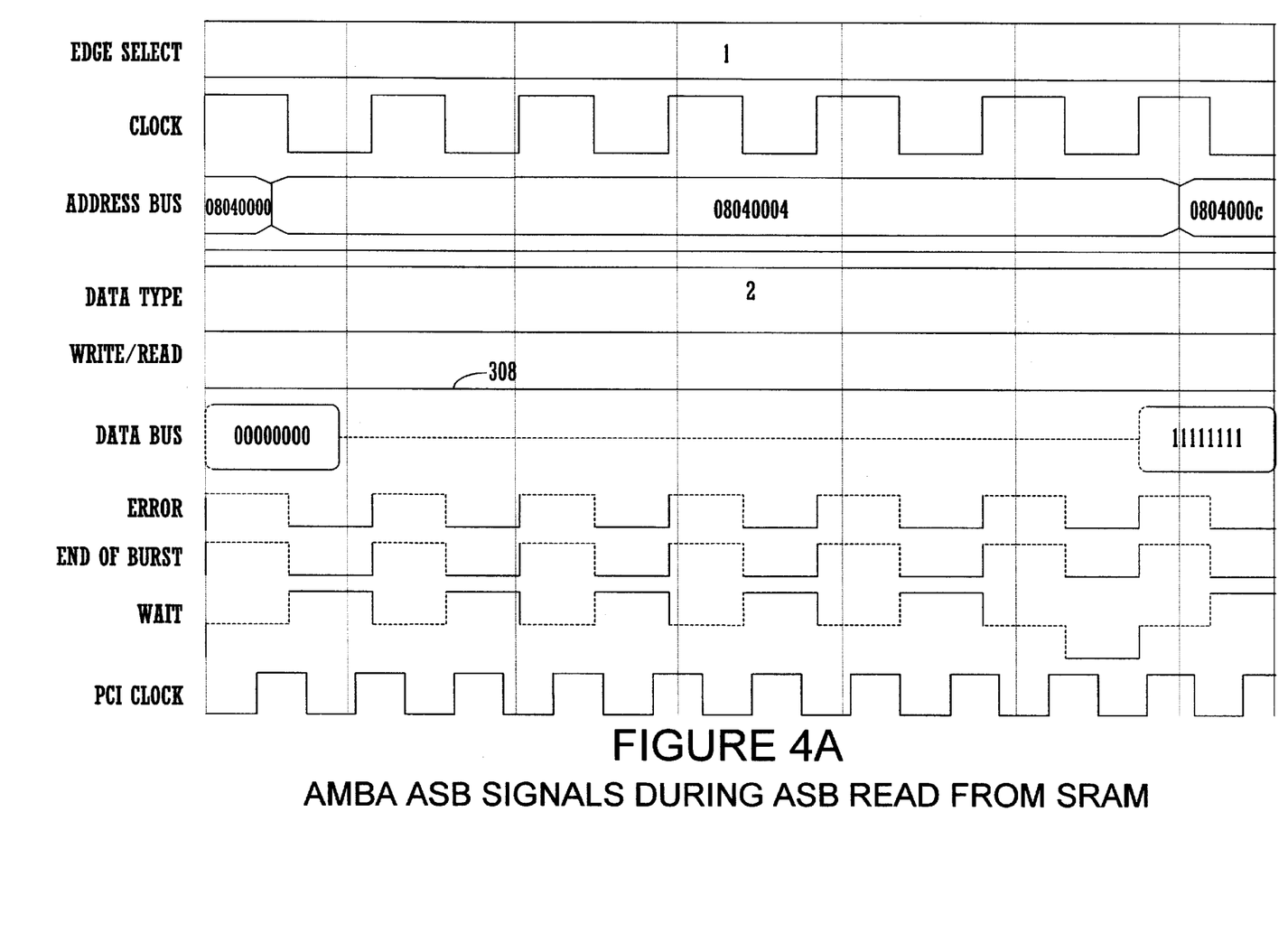
FIG. 4A shows the ASB signals during an ASB Read cycle from SRAM.
Figure 4B:
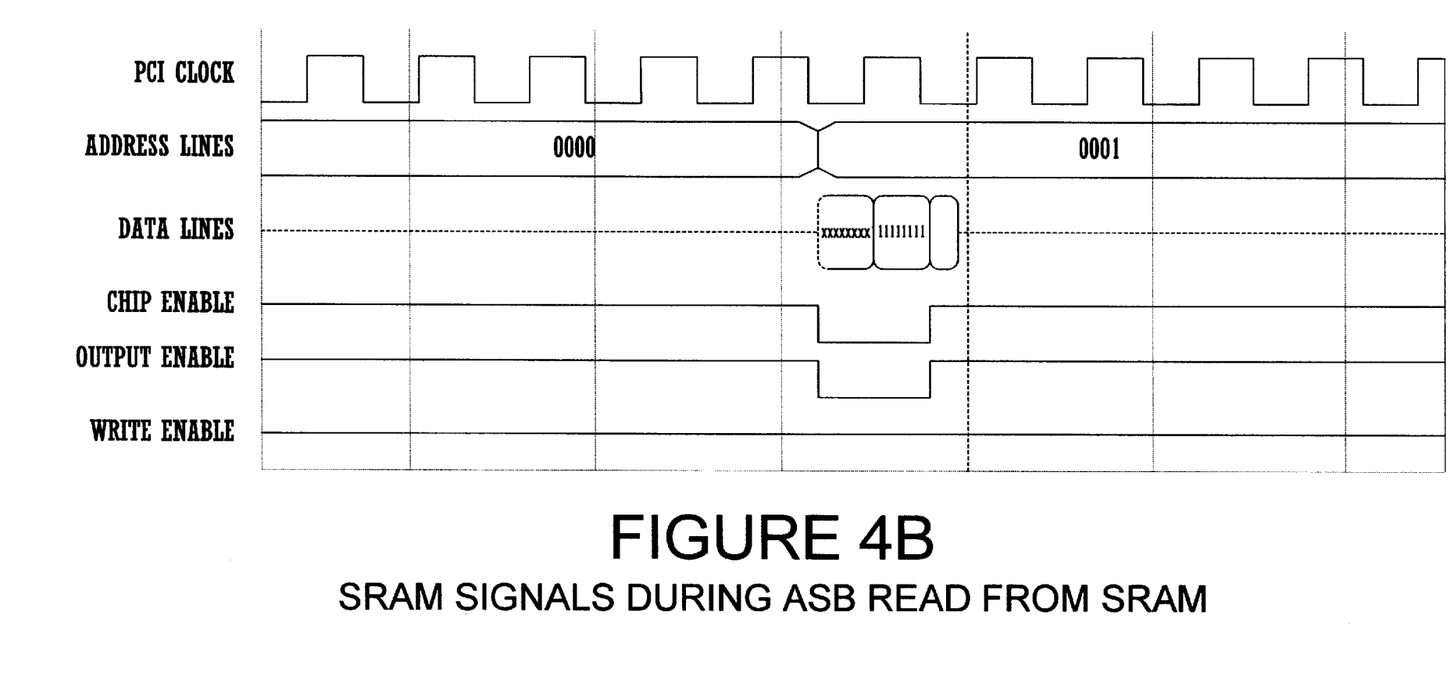
FIG. 4B shows the corresponding SRAM signals during the ASB Read cycle from SRAM.

FIG. 4A shows the corresponding AMBA ASB signals during an ASB Read from SRAM cycle. Write/Read signal 308 is now in the Low condition, indicating that the ASB Read is active. FIG. 4B shows the corresponding SRAM signals during an ASB Read from SRAM cycle.

Figure 5A:
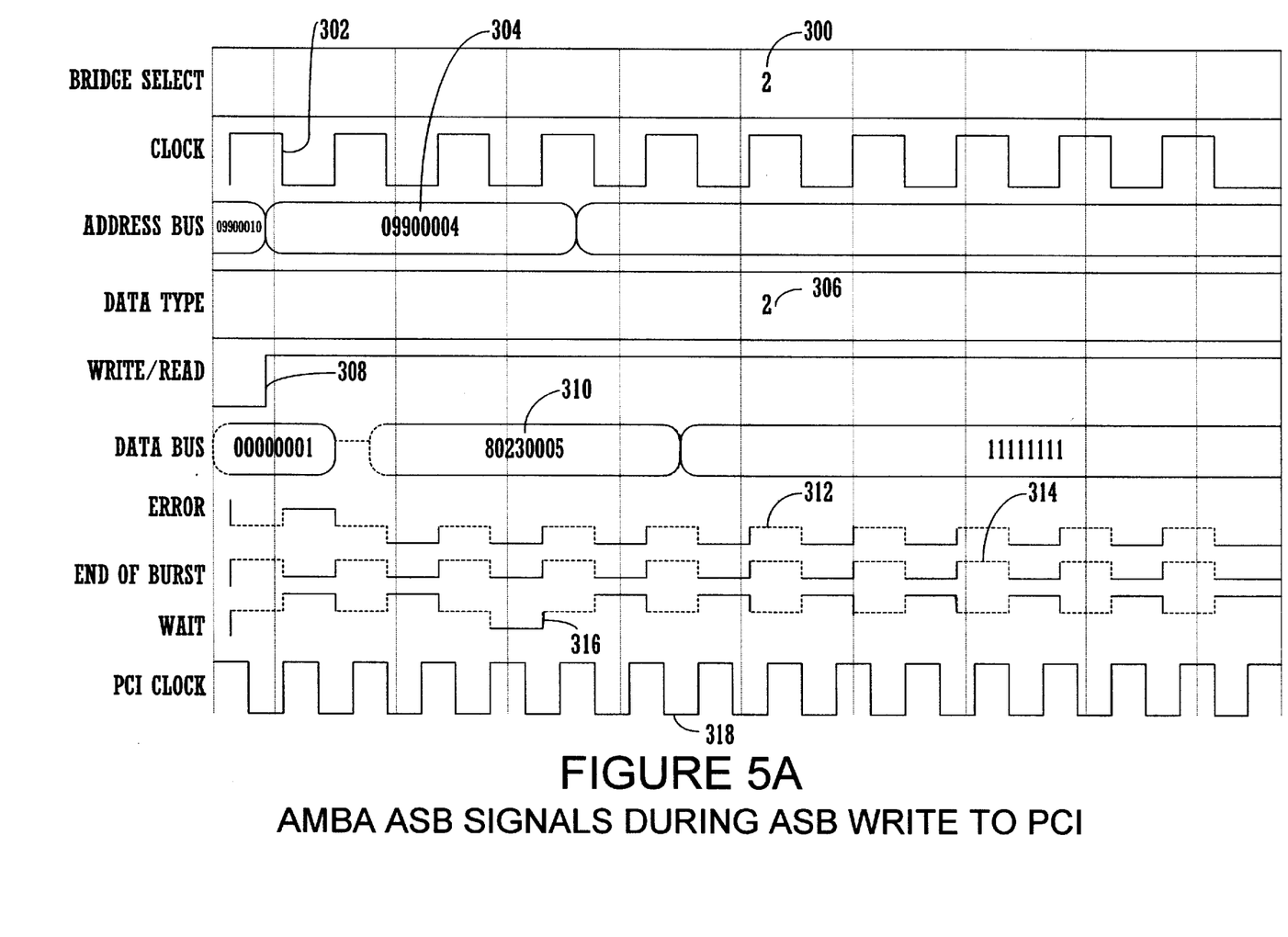
FIG. 5A shows the ASB signals during an ASB Write cycle to the PCI bus.

Referring now to FIG. 5A, the AMBA ASB signals during an ASB Write to PCI cycle is shown. Bridge Select signal 300 in the "2" condition indicates that the bridge system is selected and active for (a Write or Read) data transfer to PCI. The AMBA ASB domain Clock 302 operates at a frequency that is in the range of 4 MHz to 20 MHz. Address Bus signal 304 indicates the PCI device address for data transfer. Data Type signal 306 in the "2" condition indicates that 4 bytes (or a full word in ARM's AMBA terminology) are being transferred. Write/ Read signal 308 indicates that the ASB Write is selected in the High condition. Data Bus signal 310 contains the data being transmitted from the ASB to the PCI device. Error signal 312 indicates whether there has been an error during the ASB Write cycle. End of Burst signal 314 indicates the end of a burst transmission from the ASB to another device in the High condition. Wait signal 316 is in the High condition to insert wait cycles, or goes Low to indicate that it is ready to handle data transfer. PCI clock 318 operates at the standard PCI clock frequency of 33 MHz.

Figure 5B:
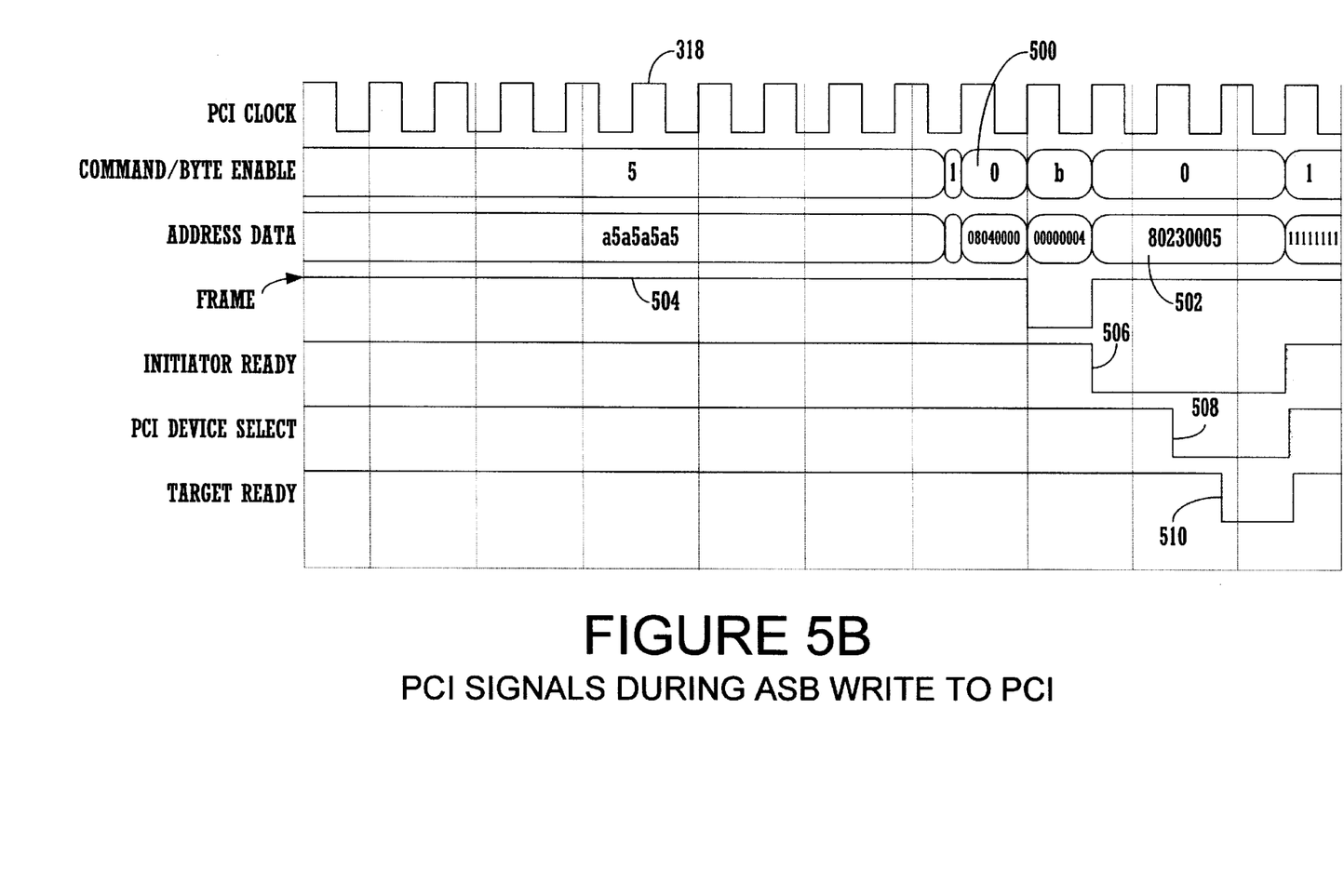
FIG. 5B shows the corresponding PCI signals during the ASB Write cycle to the PCI bus.

With reference now to FIG. 5B, the PCI signals during an ASB Write to PCI cycle is shown, and consists of the standard PCI signals. Command/Byte Enable signal 500 indicates either the Command phase or the Byte Enable phase in turn. Address Data signal 502 indicates a PCI device address for data transfer when in synchronization with that Command phase, and indicates the data to be transferred to the PCI device when in synchronization with that Byte Enable phase. Frame signal 504 indicates the start of the PCI cycle with Command and Address Data. Initiator Ready signal 506 in synchronization with Target Ready signal 510 indicate that data is being transferred. PCI Device Select signal 508 indicates a PCI device is selected to receive the data being transferred.

Figure 6A:
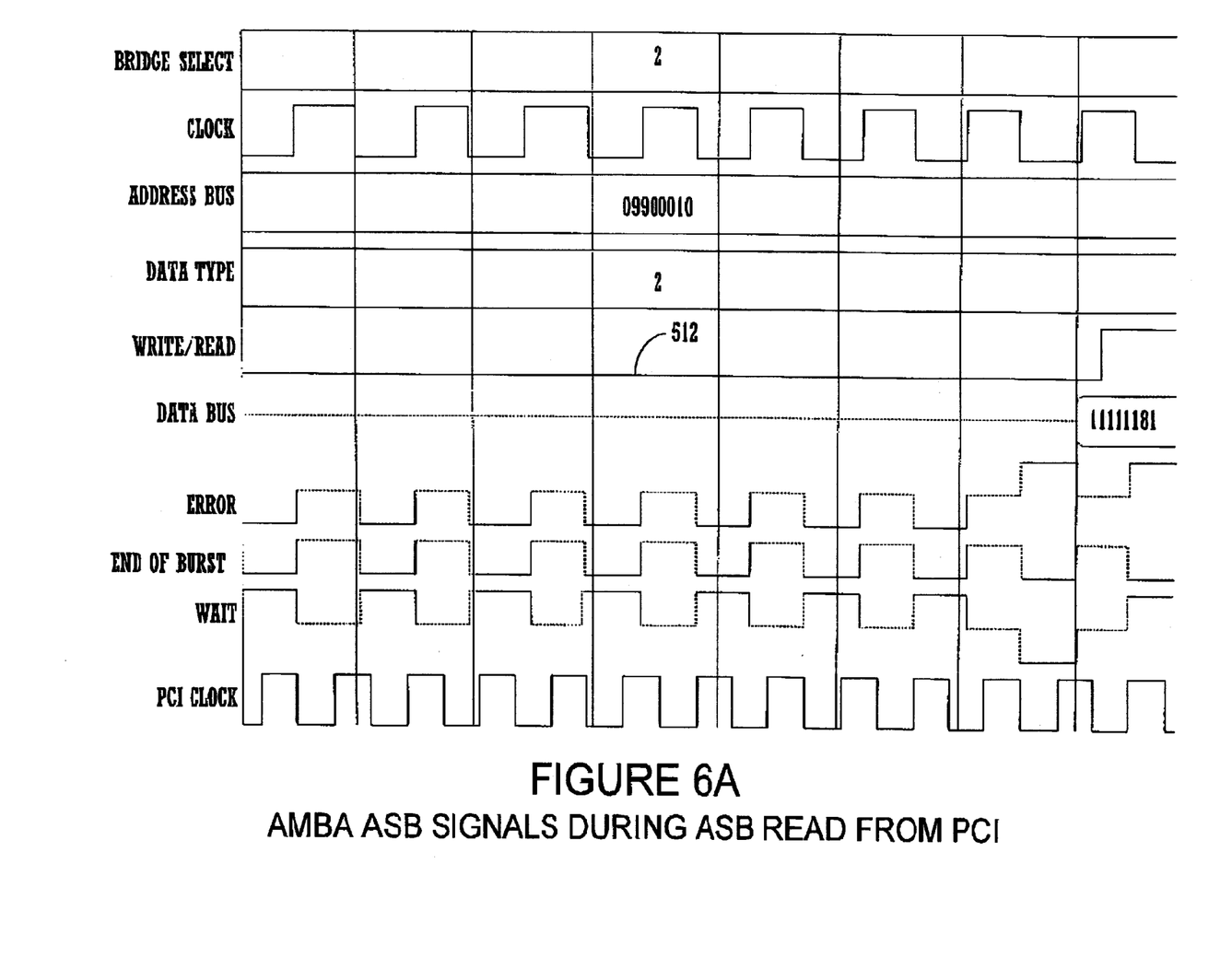
FIG. 6A shows the ASB signals during an ASB Read cycle from the PCI bus.

FIG. 6A in turn shows the corresponding AMBA ASB signals during an ASB Read cycle from the PCI bus. Write/Read signal 512 is selected in the Low condition, indicating an ASB Read cycle is active.

Figure 6B:
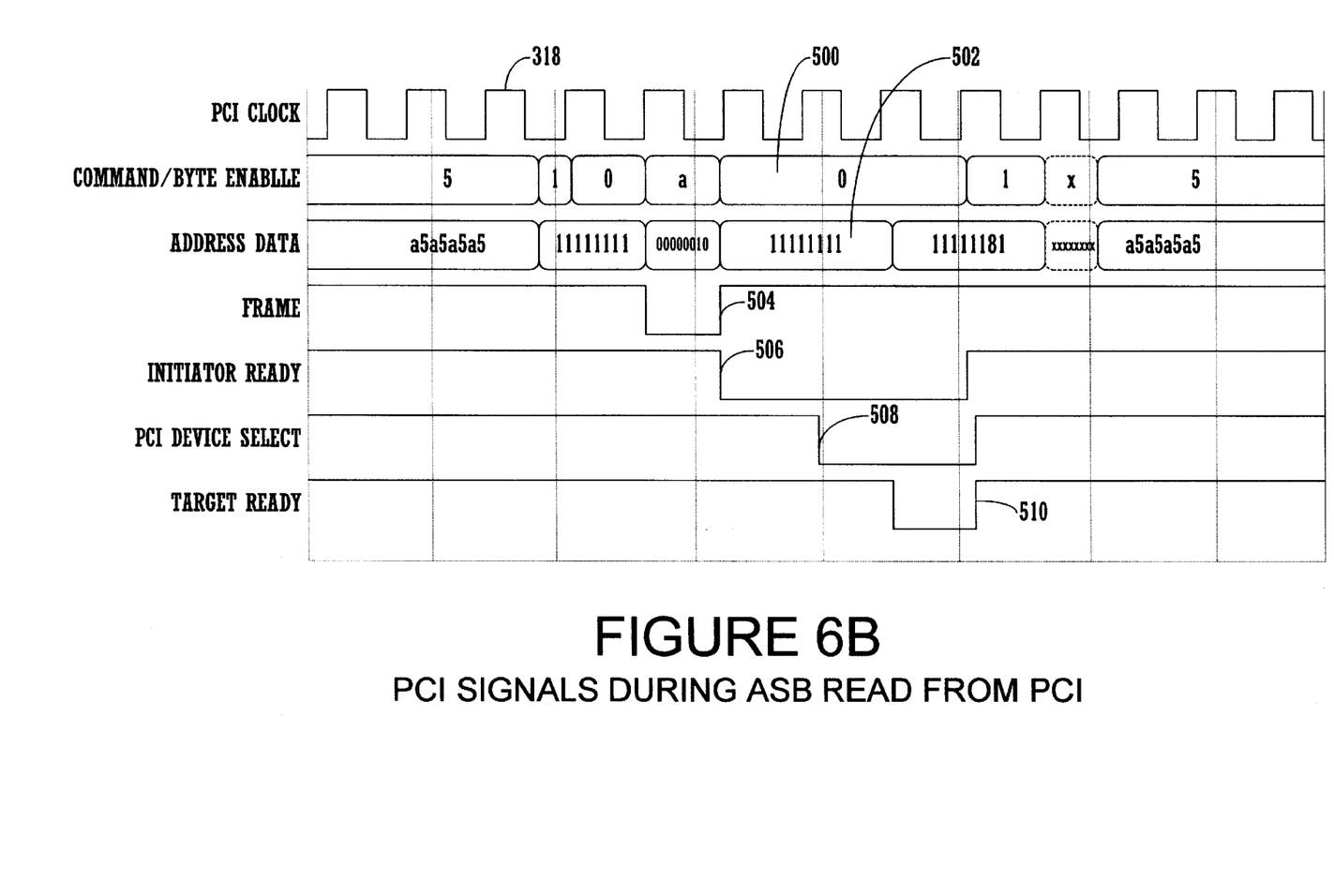
FIG. 6B shows the corresponding PCI signals during the ASB Read cycle from the PCI bus.

FIG. 6B shows the corresponding PCI signals during the ASB Read cycle from the PCI bus. Again, Command/Byte Enable signal 500 indicates either the Command Enable phase or the Byte Enable phase in turn. Address Data signal 502 indicates the PCI device address for data transfer when in synchronization with that Command Enable phase, and indicates the data to be transferred to the PCI device when in synchronization with that Byte Enable phase. Frame signal 504 indicates the start of the PCI cycle with Command Enable and Address Data. Initiator Ready signal 506 in synchronization with Target Ready signal 510 indicate that data is being transferred. PCI Device Select signal 508 indicates the PCI device transferring the data being transferred.

The preferred embodiment of the present invention, a bridge between the PCI bus and a RISC processor interface bus, is described. While the present invention has been described in particular embodiments, it should be appreciated that the present invention should not be construed as limited by such embodiments, but rather construed according to the below claims.

What is claimed is:

1. An interface circuit comprising:
   a RISC processor bus;
   a RISC processor interface unit coupled to said RISC processor bus for generating memory access requests and for generating requests over a Peripheral Component Interconnect bus;
   a memory unit;
   a memory interface unit coupled to said memory unit and for responding to memory access requests to said memory unit;
   a Peripheral Component Interconnect interface unit coupled to said Peripheral Component Interconnect bus, said Peripheral Component Interconnect interface unit for communicating with a Peripheral Component Interconnect device;
   an internal bus coupled to said RISC processor interface unit, said memory interface unit and said Peripheral Component Interconnect interface unit; and
   a RISC processor coupled to said RISC processor bus, said RISC processor bus an Advanced Microcontroller Bus Architecture Advanced System Bus, said RISC processor for communicating with said memory unit and with said Peripheral Component Interconnect device, wherein said RISC processor interface unit operates at a first clock frequency and wherein said Peripheral Component Interconnect interface unit operates at a second clock frequency.

2. The interface circuit of claim 1 wherein said first clock frequency is within the range of 4 MHz to 20 MHz and wherein said second clock frequency is 33 MHz.

3. The interface circuit of claim 1 wherein said first clock frequency is within the range of 4 MHz to 20 MHz and wherein said second clock frequency is 66 MHz.

4. The interface circuit of claim 1 wherein said RISC processor interface unit is for synchronizing address and data information in accordance with said Peripheral Component Interconnect interface unit.

5. The interface circuit of claim 1 further comprising means for synchronizing data requests across said first and second clock domains, said means for synchronizing data requests coupled between said RISC processor interface unit and said internal bus.

6. The interface circuit of claim 1 wherein said memory unit comprises a plurality of integrated circuit memory banks and wherein said memory interface unit comprises a byte accessible memory unit coupled to said plurality of integrated circuit memory banks using a single chip enable control line for byte accessing information to and from said memory unit.

7. The interface circuit of claim 1 wherein said Peripheral Component Interconnect interface unit comprises a zero latency buffer circuit for buffering data to be transferred between said RISC processor and said Peripheral Component Interconnect interface unit.

8. The interface circuit of claim 1 further comprising a plurality of Peripheral Component Interconnect peripheral devices coupled to said Peripheral Component Interconnect bus.

9. The interface circuit of claim 1 further comprising a Peripheral Component Interconnect Arbiter coupled to said Peripheral Component Interconnect bus for arbitrating memory access to said Peripheral Component Interconnect bus.

10. The interface circuit of claim 1 wherein said memory unit is a Static Random Access Memory device.

11. An interface circuit comprising:
    a RISC processor bus; said RISC processor bus and Advanced Microcontroller Bus Architecture Advanced System Bus;
    a RISC processor interface unit coupled to said RISC processor bus for generating memory access requests and g requests over a Peripheral Component Interconnect bus;
    a memory interface unit for responding to memory access requests to a memory unit;
    a Peripheral Component Interconnect interface unit coupled to said Peripheral Component Interconnect bus,said Peripheral Component Interconnect interface unit for communicating with a PCI device;
    an internal bus coupled to said RISC processor interface unit, said memory interface unit and said Peripheral Component Interconnect interface unit; and
    a RISC processor coupled to said RISC processor bus, said RISC processor for communicating with said memory unit and with said Peripheral Component Interconnect device, wherein said RISC processor interface unit operates at a first clock frequency, wherein said Peripheral Component Interconnect interface unit operates at a second clock frequency, said second clock frequency operating at a frequency faster that said first clock frequency, and wherein said RISC processor interface unit, said memory interface unit, said internal bus and said Peripheral Component Interconnect interface unit are comprised of a single integrated circuit device.

12. The interface circuit of claim 11 wherein said first clock frequency is within the range of 4 MHz and 20 MHz and wherein said second clock frequency is 33 MHz.

13. The interface circuit of claim 11 wherein said first clock frequency is within the range of 4 MHz and 20 MHz and wherein said second clock frequency is 66 MHz.

14. The interface circuit of claim 11 wherein said RISC processor interface unit is for synchronizing address and data information in accordance with said Peripheral Component Interconnect interface unit.

15. The interface circuit of claim 11 further comprising means for synchronizing data requests across said first and second clock domains, said means for synchronizing data requests coupled between said RISC processor interface unit and said internal bus.

16. The interface circuit of claim 11 wherein said memory unit comprises a plurality of integrated circuit memory banks and wherein said memory interface unit comprises a byte accessible memory unit coupled to said plurality of integrated circuit memory banks using a single chip enable control line for byte accessing information to and from said memory unit.

17. The interface circuit of claim 11 wherein said Peripheral Component Interconnect interface unit comprises a zero latency buffer circuit for buffering data to be transferred between said RISC processor and said Peripheral Component Interconnect interface unit.

18. The interface circuit of claim 11 further comprising a plurality of Peripheral Component Interconnect peripheral devices coupled to said Peripheral Component Interconnect bus.

19. The interface circuit of claim 11 wherein said single integrated component further comprises said memory unit.

20. The interface circuit of claim 11 further comprising a Peripheral Component Interconnect Arbiter coupled to said Peripheral Component Interconnect interface unit for arbitrating memory access to said Peripheral Component Interconnect bus.

21. An interface circuit comprising:

a RISC processor bus;

a RISC processor interface unit coupled to said RISC processor bus and to an internal bus for generating memory access requests and for generating requests over a Peripheral Component Interconnect bus;

a memory interface unit for responding to memory access requests to a memory unit;

a Peripheral Component Interconnect interface unit coupled to said Peripheral Component Interconnect bus and to said memory interface unit, said Peripheral Component Interconnect interface unit for communicating with a Peripheral Component Interconnect device;

said internal bus coupled to said Peripheral Component Interconnect interface unit and to memory interface unit; and a RISC processor coupled to said RISC processor bus, said RISC processor bus a Advanced Microcontroller Bus Architecture Advanced System Bus, said RISC processor for communicating with said memory unit and with said Peripheral Component Interconnect device, wherein said RISC processor interface unit operates at a first clock frequency, wherein said Peripheral Component Interconnect interface unit operates at a second clock frequency, and wherein said RISC processor interface unit, said memory interface unit, said internal bus and said Peripheral Component Interconnect interface unit are comprised of a single integrated circuit device.

* * * * *